June 14, 1966     W. W. DRUMMOND     3,256,078
METHOD AND APPARATUS FOR FORMING FIBERS
Original Filed Nov. 14, 1960
FIG. 1
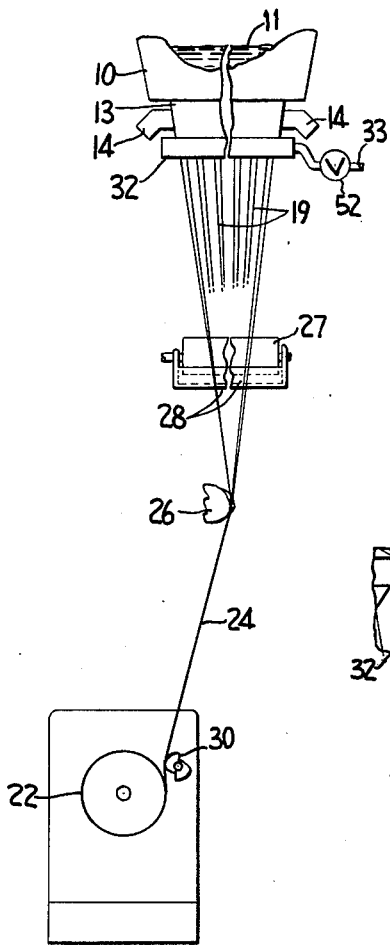
FIG. 2
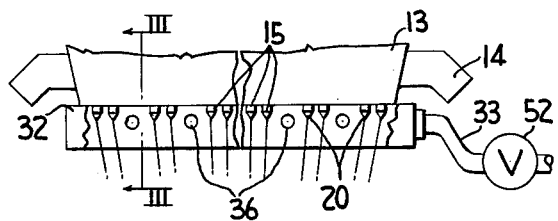
FIG. 3     FIG. 4
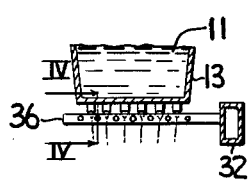 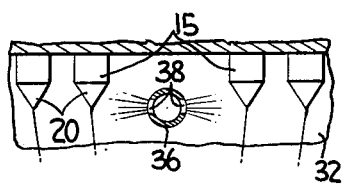
FIG. 5     FIG. 6
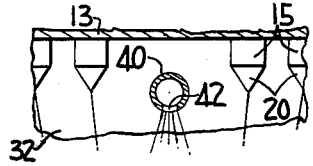 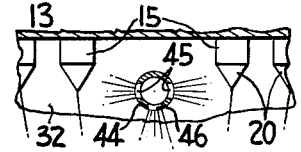
FIG. 7     FIG. 8
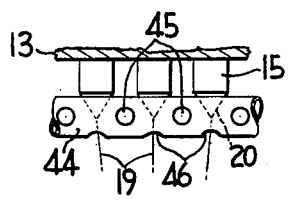 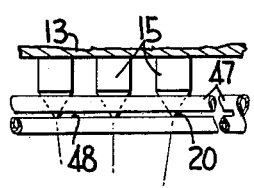
FIG. 10     FIG. 9
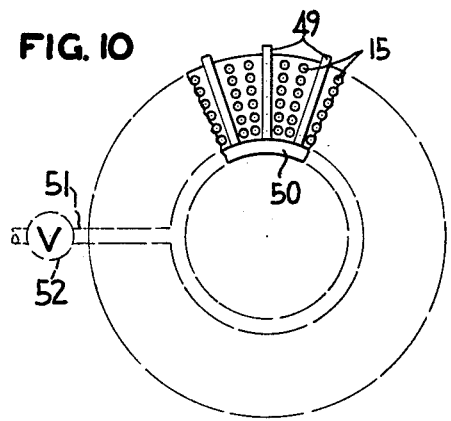 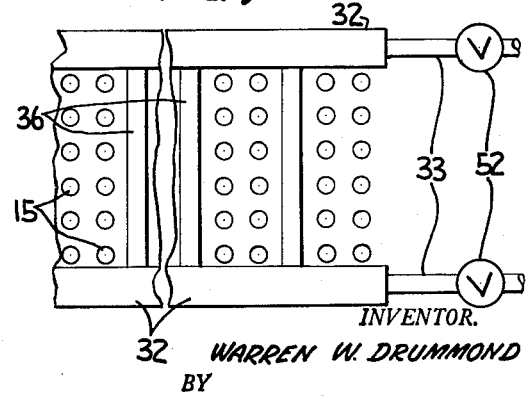
INVENTOR.
WARREN W. DRUMMOND
BY Oscar L. Spencer
ATTORNEY

United States Patent Office

3,256,078
Patented June 14, 1966

3,256,078
METHOD AND APPARATUS FOR FORMING FIBERS
Warren W. Drummond, Allison Park, Pa., assignor to Pittsburgh Plate Glass Company, Pittsburgh, Pa., a corporation of Pennsylvania
Continuation of abandoned application Ser. No. 68,860, Nov. 14, 1960. This application Feb. 10, 1964, Ser. No. 344,167
9 Claims. (Cl. 65—2)

This application is a continuation of my copending application, Serial No. 68,860, filed November 14, 1960, entitled "Method and Apparatus for Producing Fibers," now abandoned.

The present invention relates to a method and apparatus for producing thermoplastic, continuous filament fibers and it has particular relation to a method and apparatus for producing continuous filament glass fibers.

Continuous filament glass fibers have been produced according to the process shown in U.S. Patent No. 2,291,289. In this process, molten glass is contained in a platinum alloy, trough-like chamber known as a bushing. The bushing is electrically heated by passing electric current through it and the glass is heated by contact with the hot bushing. The bushing contains a plurality of orifices in its bottom with cylindrical, hollow tips projecting downwardly from the bottom of the bushing in line with the orifices to deliver the glass. The glass is pulled from the tips into fine, continuous filaments by suitable means such as a winder. The filaments are passed over a gathering guide and grouped into a strand before being collected on the winder.

The critical point in the fiber forming process is where the fibers are pulled from the bushing tips and stretched out exceedingly rapidly to form the very fine filaments. The molten glass forms as an inverted cone hanging from the bushing tip, and the filament is pulled from the apex of the cone at a rate of about 2 to 3 miles per minute. The diameter of the cone of glass at its base is of the order of 0.075 inch, and the diameter of the filaments pulled from the cone is of the order of 5 to 20 microns. It is calculated that the acceleration of the glass as it passes from the base of the cone to the apex of the cone and away therefrom is somewhere in the neighborhood of 240,000 G's within a fraction of a second and within the space of a fraction of an inch.

In order to accomplish this, it has been found to be necessary to control the temperature of the glass in the cone and adjacent to it very carefully. The glass is heated in the bushing to a temperature at which it is quite fluid in order to insure that the glass is in a highly refined state. At this temperature it is much too fluid for fiber forming and it must be cooled by the time it reaches the cones so that it is viscous enough for fiber forming. Some cooling is accomplished as the glass passes through the bushing tips and the glass is cooled to fiber drawing temperature as it is exposed to the atmosphere while suspended in the cone.

Accelerated cooling of the glass in the cone has been accomplished by directing a continuous flow of cool air against the cones and bushing tips as shown in the above-mentioned patent. This is satisfactory when there are only two rows of tips. The glass fiber art has now moved to the point where there are 200, 400 and even 600 orifices and tips in a single bushing, and this has necessitated that the tips be arranged in more than two rows, for example, from 4 to 20 or more parallel rows of tips extending in the long dimension of the bushing and having 30 to 50 or more tips in each row. The prior method of cooling by directing air against the tips and cones is not satisfactory for continuous fiber forming with this many rows of tips and cones. The outside rows of tips and cones are cooled more than the inside rows, and the uneven cooling results in erratic performance of the fiber forming process.

It is an object of this invention to provide an improved method of forming continuous, thermoplastic filaments, particularly strands of multi-filament glass fibers, where the filaments are drawn from a bushing having more than two longitudinal rows of orifices, for example 4 to 20 or more longitudinal rows of orifices. It is a further object of the invention to provide an improved method of stabilizing the fiber forming conditions, particularly the temperature of the cones of glass suspended from the bushing tips in a continuous filament glass fiber process. It is also an object of the invention to provide controlled cooling of all of the cones of glass suspended from the bushing tips in a fiber forming process and to control the atmospheric conditions in the areas surrounding the cones. It is an object of the invention to provide uniform cooling of the cones of glass suspended from both the interior and the peripheral tips.

These and other objects of the invention are accomplished by conducting individual streams of a cooling fluid such as air between the rows of cones of glass and then changing the direction of the fluid after it passes the outside cones to direct it into the areas between the cones of glass and the filaments drawn therefrom. This is done by discharging the cooling fluid from small ducts or tubes extending between either transverse or longitudinal rows of the glass cones or the filaments of glass just below the cones of glass. The cooling fluid may be directed horizontally from the tubes and/or it may be directed vertically downwardly from the tubes and/or it may have both vertical and horizontal complements in its flow. The tubes extend between the rows of cones and/or filaments from a supply header located at the side of the bushing. The manner of accomplishing the objects of the invention is further described in conjunction with the drawing in which:

FIG. 1 is an elevation of a glass fiber forming process utilizing the present invention;

FIG. 2 is an elevation illustrating apparatus for stabilizing the fiber forming process;

FIG. 3 is a view in section taken along lines III—III of FIG. 2;

FIG. 4 is an enlarged elevation illustrating the placement of the discharge outlets in the apparatus shown in FIGS. 2 and 3;

FIG. 5 is a view similar to FIG. 4 showing another embodiment of the invention;

FIG. 6 is a view similar to FIGS. 4 and 5 showing a further embodiment of the invention;

FIG. 7 is a side view further illustrating the embodiment of the invention shown in FIG. 6;

FIG. 8 is a side view similar to FIG. 7 showing another embodiment of the invention;

FIG. 9 is a diagrammatic plan view illustrating the present invention with regard to bushing tip layout; and FIG. 10 is a diagrammatic plan view illustrating the invention in combination with an annular bushing.

In FIG. 1 of the drawing there is shown a glass melting furnace or forehearth thereof 10 containing a supply of molten glass 11 and having a bushing 13 attached to the bottom of the furnace. The bushing is made of a platinum-rhodium alloy containing approximately 90 percent platinum, and it is trough-like in shape. It is heated by electric current which is passed through terminals 14 connected to the ends of the bushing. The bottom face of the bushing is provided with a series of orifices with a hollow tip 15 extending downwardly at each orifice. The tips 15 are formed in a number of longitudinal rows, for example, 4 to 20 or more rows having 30 to 50 or more tips in each row so that the total number of tips is 200 or more in number. The tips in each longitudinal row are aligned with the tips in adjacent rows to form transverse rows which are usually arranged in pairs with the space between the pairs of rows being slightly larger than the space between the rows forming a pair of rows.

Glass filaments 19 are pulled from cones of glass 20 which are suspended from each of the tips 15. These filaments are pulled at a very high rate of speed, i.e., 5,000 to 20,000 feet per minute, and wound on a rapidly rotating forming tube 22. The glass filaments are grouped into a strand 24 as they pass over a gathering guide 26 prior to their being wound on the forming tube 22. Usually a size made up of a liquid binder and lubricant such as a combination of starch and vegetable oil is applied to the filaments as they pass over a rotating roller 27 mounted in a container 28 holding a supply of the size. This is done prior to the time they are grouped into a strand. As the strand 24 is wound on the tube 22, it is rapidly traversed along the length of the tube by means of a suitable rotating traverse mechanism 30.

In accordance with the present invention, an air supply header 32 is mounted below the bushing 13 at about the same level as the tips 15 and cones of glass 20. A cooling fluid such as air is supplied to the header by means of suitable conduit 33. This header, shown more clearly in FIGS. 2 and 3, extends along the outside longitudinal row of tips a short distance from them and supplies air for discharge from small orifices in the inboard side of the header 32. The air is conveyed from the orifices in the header by small hypodermic needles or tubes 36 which extend outwardly at a right angle from the header in a horizontal plane and project between the pairs of transverse rows of cones of glass 20. Each of these tubes 36 has small openings 38 in the sides or bottom of them so that air can be projected from the tubes between the cones of glass. The openings may be formed by drilling round holes or cutting rectangular slots or long slits in the tubes. The tubes extend completely across the under side of the bushing and extend beyond the farthest row of tips and cones so that air is projected from the tubes between all of the cones of glass. The inside diameter of the tubes 36 may be, for example, 0.008 to 0.25 inch. The tubes may be flattened and have straight sides so as to take up less space between the rows of tips and cones.

The air is directed between the cones of glass 20 and filaments 19 drawn therefrom at a low pressure, for example, at a pressure of 2.0 to 200 inches of water. The pressure of the air is just sufficient to propel the cooling air between the cones of glass and filaments, but is not so great as to interrupt the fiber forming process. Room temperature air may be used or cooled air may be used. It is also contemplated that other cooling fluids be employed such as steam, nitrogen, carbon dioxide, sulfur dioxide or other gases suitable for cooling and otherwise controlling the atmosphere in and around the bushing tip area. The header 32 is sufficient in size to provide the amount of air required.

In essence, the header 32, the tubes 36 and the fluid blown from them provide a controlled atmosphere for the tips and cones and partially exclude the surrounding atmosphere and its random variations in temperature, turbulence and velocity. They also prevent the development of a negative pressure area under the bushing which was formerly caused by the removal of air by inspiration along the rapidly moving fibers. The negative pressure area collapsed and caused a constant pulsing of air along the fiber which led to tension pulses and variations in diameter in the fiber being drawn. By uniformly feeding air into this normally negative pressure zone, laminar flow of air along the fiber path results and this pulsing is reduced. This permits the formation of fibers having a constant diameter along their length. Another advantage is that foreign material normally present in the atmosphere around the forming area is now substantially excluded from the area just beneath the bushing. This foreign material when inspired often caused fiber breakage, particularly at the gathering guide.

In FIGS. 4 and 5 there are shown views illustrating several embodiments of the invention with regard to the location of tubes 36 and the openings in them. In FIG. 4 the tubes 36 are shown as having openings 38 in their sides so as to project the cooling fluid horizontally between the cones of glass. In FIG. 5 tubes 40 are shown having openings 42 in their bottom portion so as to direct air downwardly away from the bushing and parallel to the movement of the filaments 19.

In FIGS. 6 and 7 the tubes 44 are shown as having openings 45 and 46 in both the sides and the bottom respectively of the tubes so that air is projected horizontally as well as downwardly. The openings 45 are located in the tubes so that the air may be directed between the cones, and the openings 46 are located in the bottom of the tubes so that the air which is directed downwardly is in line with the cones between adjacent cones in a longitudinal row of tips and cones. Other arrangements of openings in the tubes may be employed. For example the size of the openings in the tubes may be greater at the locations approximating the central area of the cones and become smaller as they progress toward the outermost cones so as to insure uniformity of cooling of all of the cones and filaments drawn therefrom.

In FIG. 8 the tube 47 is shown as having a continuous slit in its side running for a distance which may be equal to the distance across the bottom of the bushing or may be less than that distance. The long slit or a multiple of shorter slits may be employed place of the openings 38, 42, 45 and 46. The slits may be directed downwardly or at an angle between horizontal and vertical planes. The tubes 47 are preferably employed at a level opposite the level of the apices of the cones or slightly lower where the filament 19 is undergoing its attenuation.

In FIGS. 9 and 10 there are shown diagrammatic plan views illustrating several embodiments of the invention with respect to bushing tip layout. In FIG. 9 there is shown a rectangular bushing tip layout having six longitudinal rows and having the tips 15 in the longitudinal rows grouped transversely into pairs of rows with spaces between the pairs through which the tubes 36 extend. A double header 32 is employed in this embodiment with the header 32 being located on both sides of the bushing. In FIG. 10 there is shown an annular bushing tip layout with the longitudinal rows in this instance being the annular rows and the transverse rows being the radially extending rows. The tubes 49 extend radially from a centrally located header 50 which is supplied with the cooling fluid by supply line 51. It is also contemplated in the designs illustrated in FIGS. 9 and 10 that the tubes may extend between the longitudinal rows of cones rather than between the transverse rows, but the latter is preferred for more uniform control.

It can be seen from the above description of the invention that a simple method of controlling the atmospheric conditions in the critical areas surrounding the tips and cons of glass suspended therefrom has been provided and that a controlled method of stabilizing the fiber forming conditions in these areas is achieved. The present invention has permitted the continuous operation of the fiber forming process with an increased degree of efficiency and without the problems encountered by the prior art.

Several other advantages can be realized from the present invention. Suitable flow control means 52 can be inserted in the fluid supply lines to increase or decrease the rate of flow of the cooling gases. Adjustments in air flow can be made from one bushing position to another to obtain the best operation conditions for each bushing in a forehearth independent of the other bushings. The flow of glass between fiber forming runs can be decreased by greatly increasing the flow of cooling gases during the interval between forming runs. This helps to minimize glass waste. Also, the glass at start-up is thus cooler and this permits the operator to handle it without burning his hands. When the new forming run is started, the air flow is again reduced to that rate which has been found optimum for the particular bushing.

Although the present invention has been described with regard to specific details of certain embodiments thereof, it is not intended that such details serve as limitations on the invention except insofar as set forth in the accompanying claims.

I claim:
1. A method of forming thermoplastic fibers such as glass fibers which comprises drawing a plurality of continuous filaments from molten streams of the thermoplastic material passing through orifices aligned in a plurality of rows in the bottom of a bushing, conducting a pressurized cooling gas between the rows of filaments just below the bushing and releasing the gas from locations between the rows of filaments and into the zone below the bushing.

2. A method of forming glass fibers which comprises drawing a plurality of continuous filaments of glass from streams of glass passing through orifices aligned in a plurality of rows in the bottom of a bushing, conducting a pressurized cooling gas between the rows of filaments and into the zone just below the bushing and releasing said gas from locations between the rows of filaments into said zone during the drawing of the filaments, stopping the drawing of the filaments, increasing the flow of cooling gas while the filament drawing is discontinued, restarting the filament drawing and decreasing the flow of cooling gas to that rate established for the filament drawing.

3. Apparatus for forming glass fibers which comprises a bushing having a multiplicity of discharge orifices located in the bottom thereof and arranged in a plurality of rows, means for drawing a plurality of filaments of the thermoplastic material through the orifices, a plurality of small tubes located beneath the bushing between the rows of filaments and extending substantially the length of the rows, said tubes having openings in them along their length and means for supplying a cooling gas to the tubes for discharge therefrom through the openings and into the zone below the bushing.

4. Apparatus for forming thermoplastic fibers which comprises a bushing having a multiplicity of discharge orifices located in the bottom thereof and arranged in a plurality of rows, means for drawing a plurality of filaments through the orifices, a plurality of small tubes located beneath the bushing between the rows of filaments, said tubes having openings in them along their length, means for supplying a cooling gas to the tubes for discharge therefrom through the openings into the zone beneath the bushing, and valve means for controlling the flow of gas to the tubes.

5. Apparatus for producing filaments of heat-softenable material comprising a feeder for feeding such material in molten form having orifices from which streams of such material flow, means for continuously attenuating the streams to fine filaments in an attenuation zone immediately adjacent said feeder, a series of gas conduits extending between said orifices sub-dividing the total number of said orifices into smaller groups, and gas supply means feeding gas to said conduits, said conduits each having openings therethrough along its length for discharge of gas into said zone of attenuation.

6. A method for producing filaments of heat-softenable material comprising feeding streams of a molten form of said material from a feeder, attenuating said streams into fibers, conducting a pressurized cooling gas between the streams just below the feeder and releasing said cooling gas into the zone of attenuation of said streams from locations between said streams and controlling the diameter of said fibers to provide fibers of desired diameter by regulating the amount of cooling gas released into said zone.

7. A method for improving the stability of production of fibers of heat-softenable material comprising flowing and linearly attenuating a plurality of molten streams of such material at a rapid velocity from a feeder, and conducting a uniform flow of pressurized cooling gas into the zone of attenuation from locations between pairs of said streams and releasing said cooling gas into said zone of attenuation from locations between pairs of said streams to reduce flow of induced air into said zone from the surrounding atmosphere.

8. Apparatus for producing filaments of heat softenable material comprising a feeder having orifices through which streams of molten material flow, means for attenuating said streams into filaments, and means for conducting cooling gas into the zone of attenuation between said streams said last named means having outlets for releasing cooling gas into said zone of attenuation of said streams from locations between said streams just below the feeder.

9. Apparatus as recited in claim 8 further including means for regulating the amount of cooling gas released into said zone.

References Cited by the Examiner
UNITED STATES PATENTS

| | | | |
|---|---|---|---|
| 2,335,135 | 11/1943 | Staelin | 65—12 |
| 2,908,036 | 10/1959 | Russell | 65—12 |
| 3,150,946 | 9/1964 | Russell | 65—2 |

DONALL H. SYLVESTER, *Primary Examiner.*

A. D. KELLOGG, *Assistant Examiner.*